(12) United States Patent
Robins

(10) Patent No.: US 8,462,662 B2
(45) Date of Patent: Jun. 11, 2013

(54) UPDATING NODE PRESENCE BASED ON COMMUNICATION PATHWAY

(75) Inventor: David S. Robins, Buffalo Grove, IL (US)

(73) Assignee: Google Inc., Mountain View, CA (US)

( * ) Notice: Subject to any disclaimer, the term of this patent is extended or adjusted under 35 U.S.C. 154(b) by 775 days.

(21) Appl. No.: 12/608,837

(22) Filed: Oct. 29, 2009

(65) Prior Publication Data

US 2010/0150026 A1   Jun. 17, 2010

Related U.S. Application Data

(63) Continuation-in-part of application No. PCT/US2009/044277, filed on May 16, 2009, which is a continuation-in-part of application No. 12/607,040, filed on Oct. 27, 2009.

(60) Provisional application No. 61/109,496, filed on Oct. 29, 2008, provisional application No. 61/140,887, filed on Dec. 25, 2008, provisional application No. 61/140,880, filed on Dec. 25, 2008, provisional (Continued)

(51) Int. Cl.
*H04L 12/28* (2006.01)
*H04L 12/26* (2006.01)

(52) U.S. Cl.
CPC ..................................... *H04L 12/26* (2013.01)
USPC ......................................................... 370/254

(58) Field of Classification Search
None
See application file for complete search history.

(56) References Cited

U.S. PATENT DOCUMENTS 3,805,265 A   4/1974 Lester
4,165,024 A   8/1979 Oswalt et al.

(Continued)

OTHER PUBLICATIONS

Information Disclosure Statement (IDS) Letter Regarding Common Patent Applications(s), dated Nov. 30, 2011.

(Continued)

*Primary Examiner* — John Blanton
*Assistant Examiner* — Christopher Crutchfield
(74) *Attorney, Agent, or Firm* — Tillman Wright, PLLC; Chad D. Tillman; Jeremy C. Doerre

(57) ABSTRACT

A data communications network, for which presence information is maintained for wireless data communication devices forming nodes of the network, includes: a presence server; and a plurality of nodes formed by the wireless data communication devices, each of the devices configured to send periodic check-in messages to the presence server. The presence server is configured to send an acknowledgment in response to a check-in message. Each of the wireless data communication devices is configured to reset a timer associated with the sending of the check-in messages by it upon (i) communicating, as an intermediate node, a check-in message originating at another node, and (ii) communicating, as an intermediate node, a corresponding acknowledgment originating at the presence server. The presence server is configured to update presence information of wireless data communication device from which a check-in message originates and each intermediate node.

20 Claims, 5 Drawing Sheets

Related U.S. Application Data application No. 61/147,917, filed on Jan. 28, 2009, provisional application No. 61/150,298, filed on Feb. 5, 2009, provisional application No. 61/151,168, filed on Feb. 9, 2009, provisional application No. 61/151,185, filed on Feb. 9, 2009, provisional application No. 61/155,887, filed on Feb. 26, 2009, provisional application No. 61/172,655, filed on Apr. 24, 2009, provisional application No. 61/053,665, filed on May 16, 2008, provisional application No. 61/109,494, filed on Oct. 29, 2008, provisional application No. 61/151,168, filed on Feb. 9, 2009, provisional application No. 61/140,882, filed on Dec. 25, 2008, provisional application No. 61/140,887, filed on Dec. 25, 2008, provisional application No. 61/140,888, filed on Dec. 25, 2008, provisional application No. 61/141,021, filed on Dec. 29, 2008, provisional application No. 61/147,839, filed on Jan. 28, 2009, provisional application No. 61/147,917, filed on Jan. 28, 2009, provisional application No. 61/155,887, filed on Feb. 26, 2009, provisional application No. 61/109,500, filed on Oct. 29, 2008, provisional application No. 61/109,502, filed on Oct. 29, 2008, provisional application No. 61/140,881, filed on Dec. 25, 2008, provisional application No. 61/140,882, filed on Dec. 25, 2008, provisional application No. 61/140,883, filed on Dec. 25, 2008, provisional application No. 61/141,021, filed on Dec. 29, 2008, provisional application No. 61/147,839, filed on Jan. 28, 2009, provisional application No. 61/254,126, filed on Oct. 22, 2009, provisional application No. 61/109,505, filed on Oct. 30, 2008.

(56) References Cited

U.S. PATENT DOCUMENTS

| | | |
|---|---|---|
| 4,613,990 A | 9/1986 | Halpern |
| 4,680,583 A | 7/1987 | Grover |
| 4,688,244 A | 8/1987 | Hannon et al. |
| 4,750,197 A | 6/1988 | Denekamp et al. |
| 4,775,999 A | 10/1988 | Williams |
| 4,794,368 A | 12/1988 | Grossheim |
| 4,817,537 A | 4/1989 | Cripe et al. |
| 5,040,238 A | 8/1991 | Comroe et al. |
| 5,054,052 A | 10/1991 | Nonami |
| 5,117,501 A | 5/1992 | Childress et al. |
| 5,129,096 A | 7/1992 | Burns |
| 5,210,540 A | 5/1993 | Masumoto |
| 5,265,025 A | 11/1993 | Hirata |
| 5,295,154 A | 3/1994 | Meier et al. |
| 5,331,637 A | 7/1994 | Francis et al. |
| 5,369,784 A | 11/1994 | Nelson |
| 5,400,254 A | 3/1995 | Fujita |
| 5,425,051 A | 6/1995 | Mahany |
| 5,442,758 A | 8/1995 | Slingwine et al. |
| 5,511,232 A | 4/1996 | O'Dea et al. |
| 5,565,858 A | 10/1996 | Guthrie |
| 5,579,306 A | 11/1996 | Dent |
| 5,590,409 A | 12/1996 | Sawahashi et al. |
| 5,592,533 A | 1/1997 | McHenry et al. |
| 5,596,652 A | 1/1997 | Piatek et al. |
| 5,604,892 A | 2/1997 | Nuttall et al. |
| 5,606,313 A | 2/1997 | Allen et al. |
| 5,640,151 A | 6/1997 | Reis et al. |
| 5,649,286 A | 7/1997 | Frerking |
| 5,652,751 A | 7/1997 | Sharony |
| 5,682,379 A | 10/1997 | Mahany et al. |
| 5,686,902 A | 11/1997 | Reis et al. |
| 5,732,007 A | 3/1998 | Grushin et al. |
| 5,761,195 A | 6/1998 | Lu et al. |
| 5,790,946 A | 8/1998 | Rotzoll |
| 5,793,882 A | 8/1998 | Piatek et al. |
| 5,833,910 A | 11/1998 | Teixido |
| 5,862,803 A | 1/1999 | Besson |
| 5,887,176 A | 3/1999 | Griffith et al. |
| 5,890,054 A | 3/1999 | Logsdon et al. |
| 5,892,441 A | 4/1999 | Woolley et al. |
| 5,907,491 A | 5/1999 | Canada et al. |
| 5,917,423 A | 6/1999 | Duvall |
| 5,939,982 A | 8/1999 | Gagnon et al. |
| 5,943,610 A | 8/1999 | Endo |
| 5,950,124 A | 9/1999 | Trompower et al. |
| 5,974,236 A | 10/1999 | Sherman |
| 5,977,913 A | 11/1999 | Christ |
| 6,005,884 A | 12/1999 | Cook et al. |
| 6,006,100 A | 12/1999 | Koenck et al. |
| 6,072,784 A | 6/2000 | Agrawal et al. |
| 6,078,789 A | 6/2000 | Bodenmann et al. |
| 6,091,724 A | 7/2000 | Chandra et al. |
| 6,097,707 A | 8/2000 | Hodzic et al. |
| 6,104,512 A | 8/2000 | Batey, Jr. et al. |
| 6,118,988 A | 9/2000 | Choi |
| 6,125,306 A | 9/2000 | Shimada et al. |
| 6,127,928 A | 10/2000 | Issacman |
| 6,127,976 A | 10/2000 | Boyd et al. |
| 6,134,587 A | 10/2000 | Okanoue |
| 6,154,658 A | 11/2000 | Caci |
| 6,192,400 B1 | 2/2001 | Hanson et al. |
| 6,198,913 B1 | 3/2001 | Sung et al. |
| 6,201,974 B1 | 3/2001 | Lietsalmi et al. |
| 6,256,303 B1 | 7/2001 | Drakoulis et al. |
| 6,313,745 B1 | 11/2001 | Suzuki |
| 6,354,493 B1 | 3/2002 | Mon |
| 6,360,169 B1 | 3/2002 | Dudaney |
| 6,381,467 B1 | 4/2002 | Hill et al. |
| 6,404,082 B1 | 6/2002 | Rasinski et al. |
| 6,405,102 B1 | 6/2002 | Swartz et al. |
| 6,409,082 B1 | 6/2002 | Davis et al. |
| 6,418,299 B1 | 7/2002 | Ramanathan |
| 6,424,260 B2 | 7/2002 | Maloney |
| 6,424,264 B1 | 7/2002 | Giraldin et al. |
| 6,427,913 B1 | 8/2002 | Maloney |
| 6,437,692 B1 | 8/2002 | Petite |
| 6,473,607 B1 | 10/2002 | Shohara et al. |
| 6,476,708 B1 | 11/2002 | Johnson |
| 6,512,478 B1 | 1/2003 | Chien |
| 6,529,142 B2 | 3/2003 | Yeh et al. |
| 6,542,114 B1 | 4/2003 | Eagleson et al. |
| 6,547,137 B1 | 4/2003 | Begelfer et al. |
| 6,559,620 B2 | 5/2003 | Zhou et al. |
| 6,587,755 B1 | 7/2003 | Smith et al. |
| 6,600,418 B2 | 7/2003 | Francis et al. |
| 6,611,556 B1 | 8/2003 | Koener et al. |
| 6,614,349 B1 | 9/2003 | Proctor et al. |
| 6,617,962 B1 | 9/2003 | Horwitz et al. |
| 6,665,585 B2 | 12/2003 | Kawase |
| 6,700,493 B1 | 3/2004 | Robinson |
| 6,700,533 B1 | 3/2004 | Werb et al. |
| 6,720,888 B2 | 4/2004 | Eagleson et al. |
| 6,735,630 B1 | 5/2004 | Gelvin et al. |
| 6,737,974 B2 | 5/2004 | Dickinson |
| 6,747,562 B2 | 6/2004 | Giraldin et al. |
| 6,753,775 B2 | 6/2004 | Auerbach et al. |
| 6,760,578 B2 | 7/2004 | Rotzoll |
| 6,761,312 B2 | 7/2004 | Piatek et al. |
| 6,765,484 B2 | 7/2004 | Eagleson et al. |
| 6,816,063 B2 | 11/2004 | Kubler et al. |
| 6,847,892 B2 | 1/2005 | Zhou et al. |
| 6,919,803 B2 | 7/2005 | Breed |
| 6,927,688 B2 | 8/2005 | Tice |
| 6,940,392 B2 | 9/2005 | Chan et al. |
| 6,972,682 B2 | 12/2005 | Lareau et al. |
| 6,975,614 B2 | 12/2005 | Kennedy |
| 6,975,941 B1 | 12/2005 | Lau et al. |
| 7,012,529 B2 | 3/2006 | Sajkowsky |
| 7,027,773 B1 | 4/2006 | McMillin |
| 7,072,668 B2 | 7/2006 | Chou |
| 7,088,229 B2 | 8/2006 | Johnson |
| 7,098,784 B2 | 8/2006 | Easley et al. |
| 7,103,344 B2 | 9/2006 | Menard |

| | | |
|---|---|---|
| 7,126,470 B2 | 10/2006 | Clift et al. |
| 7,142,121 B2 | 11/2006 | Chan et al. |
| 7,191,934 B2 | 3/2007 | Miller et al. |
| 7,196,622 B2 | 3/2007 | Lambright et al. |
| 7,212,122 B2 | 5/2007 | Gloekler et al. |
| 7,230,933 B2 | 6/2007 | Bahl et al. |
| 7,282,944 B2 | 10/2007 | Gunn et al. |
| 7,348,875 B2 | 3/2008 | Hughes et al. |
| 7,349,803 B2 | 3/2008 | Belenkii et al. |
| 7,349,804 B2 | 3/2008 | Belenkii et al. |
| 7,376,507 B1 | 5/2008 | Daily et al. |
| 7,440,781 B2 | 10/2008 | Beach et al. |
| 7,904,071 B2 | 3/2011 | Twitchell |
| 7,907,941 B2 | 3/2011 | Twitchell |
| 8,045,929 B2 | 10/2011 | Twitchell |
| 8,050,668 B2 | 11/2011 | Twitchell |
| 2001/0000019 A1 | 3/2001 | Bowers et al. |
| 2001/0050550 A1 | 12/2001 | Yoshida et al. |
| 2002/0002627 A1 | 1/2002 | Stead et al. |
| 2002/0039896 A1 | 4/2002 | Brown |
| 2002/0050932 A1 | 5/2002 | Rhoades et al. |
| 2002/0089421 A1 | 7/2002 | Farringdon et al. |
| 2002/0089434 A1 | 7/2002 | Ghazarian |
| 2002/0098861 A1 | 7/2002 | Doney et al. |
| 2002/0119770 A1* | 8/2002 | Twitchell, Jr. ................ 455/422 |
| 2002/0146985 A1 | 10/2002 | Naden |
| 2003/0008692 A1 | 1/2003 | Phelan |
| 2003/0012168 A1 | 1/2003 | Elson et al. |
| 2003/0019929 A1 | 1/2003 | Stewart et al. |
| 2003/0083064 A1 | 5/2003 | Cooper |
| 2003/0137968 A1* | 7/2003 | Lareau et al. ................ 370/349 |
| 2003/0141973 A1 | 7/2003 | Yeh et al. |
| 2003/0144020 A1 | 7/2003 | Challa et al. |
| 2003/0179073 A1 | 9/2003 | Ghazarian |
| 2003/0182077 A1 | 9/2003 | Emord |
| 2003/0209601 A1 | 11/2003 | Chung |
| 2003/0236077 A1 | 12/2003 | Sivard |
| 2004/0021572 A1 | 2/2004 | Schoen et al. |
| 2004/0041731 A1 | 3/2004 | Hisano |
| 2004/0100394 A1 | 5/2004 | Hitt |
| 2004/0100415 A1 | 5/2004 | Veitch et al. |
| 2004/0119588 A1 | 6/2004 | Marks |
| 2004/0121793 A1 | 6/2004 | Weigele et al. |
| 2004/0135691 A1 | 7/2004 | Duron et al. |
| 2004/0183673 A1 | 9/2004 | Nageli |
| 2004/0232924 A1 | 11/2004 | Hilleary et al. |
| 2004/0233041 A1 | 11/2004 | Bohman et al. |
| 2004/0233054 A1 | 11/2004 | Neff et al. |
| 2004/0246463 A1 | 12/2004 | Milinusic |
| 2005/0043068 A1 | 2/2005 | Shohara et al. |
| 2005/0068169 A1 | 3/2005 | Copley et al. |
| 2005/0073406 A1 | 4/2005 | Easley et al. |
| 2005/0087235 A1 | 4/2005 | Skorpik |
| 2005/0088299 A1 | 4/2005 | Bandy et al. |
| 2005/0090211 A1 | 4/2005 | Lilja et al. |
| 2005/0114326 A1 | 5/2005 | Smith et al. |
| 2005/0128080 A1 | 6/2005 | Hall et al. |
| 2005/0145018 A1 | 7/2005 | Sabata et al. |
| 2005/0146445 A1 | 7/2005 | Sleboda et al. |
| 2005/0190759 A1 | 9/2005 | Lee et al. |
| 2005/0199716 A1 | 9/2005 | Shafer et al. |
| 2005/0226201 A1 | 10/2005 | McMillin |
| 2005/0261037 A1 | 11/2005 | Raghunath et al. |
| 2005/0270160 A1 | 12/2005 | Chan et al. |
| 2006/0109106 A1 | 5/2006 | Braun |
| 2006/0114102 A1 | 6/2006 | Chang et al. |
| 2006/0135145 A1 | 6/2006 | Redi |
| 2006/0163422 A1 | 7/2006 | Krikorian et al. |
| 2006/0164232 A1 | 7/2006 | Waterhouse et al. |
| 2006/0164239 A1 | 7/2006 | Loda |
| 2006/0202817 A1 | 9/2006 | Mackenzie et al. |
| 2006/0270382 A1 | 11/2006 | Lappetelainen et al. |
| 2007/0002792 A1 | 1/2007 | Twitchell |
| 2007/0008408 A1 | 1/2007 | Zehavi |
| 2007/0032951 A1 | 2/2007 | Tanenhaus et al. |
| 2007/0127429 A1* | 6/2007 | Bryan et al. ................ 370/338 |
| 2007/0135179 A1 | 6/2007 | Hardman et al. |
| 2007/0155327 A1 | 7/2007 | Twitchell |
| 2007/0258508 A1* | 11/2007 | Werb et al. ................ 375/140 |
| 2009/0083390 A1* | 3/2009 | Abu-Ghazaleh et al. ..... 709/209 |
| 2009/0103462 A1 | 4/2009 | Twitchell |
| 2009/0252060 A1 | 10/2009 | Twitchell |
| 2009/0264079 A1 | 10/2009 | Twitchell |
| 2010/0238940 A1 | 9/2010 | Koop |

OTHER PUBLICATIONS

Information Disclosure Statement (IDS) Letter Regarding Common Patent Application(s), dated Oct. 6, 2010.
Information Disclosure Statement (IDS) Letter Regarding Common Patent Application(s), dated xx.
Information Disclosure Statemant (IDS) Letter Regarding Common Patent Application(s), dated xx.

* cited by examiner

| Nodes | No. of Hops per Node | No. of Nodes | Total No. of Node Hops (Retransmissions) |
|---|---|---|---|
| 11, 13, 15 | 8 | 3 | 24 |
| 17, 19, 21 | 6 | 3 | 18 |
| 23, 25, 27 | 4 | 3 | 12 |
| 29, 31, 33 | 2 | 3 | 6 |
| 35, 37, 39 | 0 | 3 | 0 |
| | | | 60 |

Table 1

*FIG. 4*

UPDATING NODE PRESENCE BASED ON COMMUNICATION PATHWAY

CROSS-REFERENCE TO RELATED APPLICATIONS

The present application is a U.S. nonprovisional patent application of, and claims priority under 35 U.S.C. §119(e) to, each of: U.S. provisional patent application No. 61/109, 496, filed Oct. 29, 2008, titled "Systems and Apparatus for Managing and Securing Construction and Rental Equipment", which is incorporated herein by reference; and U.S. provisional patent application No. 61/140,887, filed Dec. 25, 2008, titled "Determining Presence Based on UID in Hopped Message", which is incorporated herein by reference. The present application also is a nonprovisional of and claims priority to each of: 61/140,880; 61/147,917; 61/150,298; 61/151,168; 61/151,185; 61/155,887; and 61/172,655, each of which is incorporated herein by reference. Furthermore, the present application is a continuation-in-part of, and claims priority under 35 U.S.C. §120 to, each of:

(1) International patent application no. PCT/US2009/044277, filed May 16, 2009 and designating the United States, titled "Securing, Monitoring and Tracking Shipping Containers", which is incorporated herein by reference, and which '277 international application is a nonprovisional of and claims priority to each of,
  (a) U.S. provisional patent application 61/053,665, filed May 16, 2008, incorporated herein by reference;
  (b) U.S. provisional patent application 61/109,494, filed Oct. 29, 2008, incorporated herein by reference;
  (c) U.S. provisional patent application 61/151,168, filed Feb. 9, 2009, incorporated herein by reference;
  (d) U.S. provisional patent application 61/140,882, filed Dec. 25, 2008, incorporated herein by reference;
  (e) U.S. provisional patent application 61/140,887, filed Dec. 25, 2008, incorporated herein by reference;
  (f) U.S. provisional patent application 61/140,888, filed Dec. 25, 2008, incorporated herein by reference;
  (g) U.S. provisional patent application 61/141,021, filed Dec. 29, 2008, incorporated herein by reference;
  (h) U.S. provisional patent application 61/147,839, filed Jan. 28, 2009, incorporated herein by reference;
  (i) U.S. provisional patent application 61/147,917, filed Jan. 28, 2009, incorporated herein by reference; and
  (j) U.S. provisional patent application 61/155,887, filed Feb. 26, 2009, incorporated herein by reference; and (2) U.S. nonprovisional patent application Ser. No. 12/607, 040, filed Oct. 27, 2009, titled "Managing and Monitoring Emergency Services Sector Resources", which is incorporated herein by reference, and which '040 application is a nonprovisional of and claims priority to each of,
  (a) U.S. provisional patent application 61/140,887, filed Dec. 25, 2008, incorporated herein by reference;
  (b) U.S. provisional patent application 61/109,500, filed Oct. 29, 2008, incorporated herein by reference;
  (c) U.S. provisional patent application 61/109,505, filed Oct. 30, 2008, incorporated herein by reference;
  (d) U.S. provisional patent application 61/109,502, filed Oct. 29, 2008, incorporated herein by reference;
  (e) U.S. provisional patent application 61/140,880, filed Dec. 25, 2008, incorporated herein by reference;
  (f) U.S. provisional patent application 61/140,881, filed Dec. 25, 2008, incorporated herein by reference;
  (g) U.S. provisional patent application 61/140,882, filed Dec. 25, 2008, incorporated herein by reference;
  (h) U.S. provisional patent application 61/140,883, filed Dec. 25, 2008, incorporated herein by reference;
  (i) U.S. provisional patent application 61/141,021, filed Dec. 29, 2008, incorporated herein by reference;
  (j) U.S. provisional patent application 61/147,917, filed Jan. 28, 2009, incorporated herein by reference;
  (k) U.S. provisional patent application 61/147,839, filed Jan. 28, 2009, incorporated herein by reference;
  (l) U.S. provisional patent application 61/150,298, filed Feb. 5, 2009, incorporated herein by reference;
  (m) U.S. provisional patent application 61/151,185, filed Feb. 9, 2009, incorporated herein by reference;
  (n) U.S. provisional patent application 61/155,887, filed Feb. 26, 2009, incorporated herein by reference;
  (o) U.S. provisional patent application 61/172,655, filed Apr. 24, 2009, incorporated herein by reference; and
  (p) U.S. provisional patent application 61/254,126, filed Oct. 22, 2009, incorporated herein by reference.

Additionally, the present application hereby incorporates herein by reference each of the following identified U.S. patent applications—as well as any publications thereof and any patents issuing therefrom; the following identified U.S. patent application publications; and the following identified U.S. patent Ser. Nos. 12/468,047; 12/367,544 (US 2009-0135000 A1); Ser. No. 12/367,543 (US 2009-0161642 A1); Ser. No. 12/367,542 (US 2009-0181623 A1); Ser. No. 12/353, 197 (US 2009-0129306 A1); Ser. No. 12/352,992 (US 2009-0122737 A1); Ser. No. 12/343,865 (US 2009-0104902 A1); Ser. No. 12/343,822 (US 2009-0103462 A1); Ser. No. 12/271, 850 (US 2009-0092082 A1); Ser. No. 12/140,253 (US 2008-0303897 A1); Ser. No. 11/930,797 (US 2008-0151850 A1); Ser. No. 11/930,793 (US 2008-0112378 A1); Ser. No. 11/930, 788 (US 2008-0165749 A1); Ser. No. 11/930,785 (US 2008-0143484 A1); Ser. No. 11/930,782 (US 2008-0212544 A1); Ser. No. 11/930,779 (US 2008-0129458 A1); Ser. No. 11/930, 777 (US 2008-0111692 A1); Ser. No. 11/930,770 (US 2008-0144554 A1); Ser. No. 11/930,761 (US 2008-0112377 A1); Ser. No. 11/930,753 (US 2008-0142592 A1) now U.S. Pat. No. 7,535,339; Ser. No. 11/930,749 (US 2008-0130536 A1) now U.S. Pat. No. 7,538,658; Ser. No. 11/930,740 (US 2008-0150723 A1) now U.S. Pat. No. 7,538,657; Ser. No. 11/930, 736 (US 2008-0143483 A1) now U.S. Pat. No. 7,538,656; Ser. No. 11/847,309 (US 2007-0291724 A1); Ser. No. 11/847, 295 (US 2007-0291690 A1); Ser. No. 11/832,998 (US 2007-0273503 A1) now U.S. Pat. No. 7,378,959; Ser. No. 11/832, 991 (US 2007-0268134 A1) now U.S. Pat. No. 7,378,958; Ser. No. 11/832,979 (US 2007-0268126 A1) now U.S. Pat. No. 7,378,957; Ser. No. 11/610,427 (US 2007-0159999 A1); Ser. No. 11/618,931 (US 2007-0155327 A1); Ser. No. 11/555, 173 (US 2007-0099629 A1); Ser. No. 11/555,164 (US 2007-0099628 A1); Ser. No. 11/465,466 (US 2007-0043807 A1); Ser. No. 11/465,796 (US 2007-0041333 A1); Ser. No. 11/460, 976 (US 2008-0315596 A1); Ser. No. 11/428,536 (US 2007-0002793 A1); Ser. No. 11/428,535 (US 2007-0002792 A1); Ser. No. 11/425,047 (US 2007-0069885 A1) now U.S. Pat. No. 7,554,442; Ser. No. 11/425,040 (US 2006-0287008 A1) now U.S. Pat. No. 7,539,520; Ser. No. 11/424,850 (US 2007-0004331 A1); Ser. No. 11/424,849 (US 2007-0004330 A1) now U.S. Pat. No. 7,574,168; Ser. No. 11/424,847 (US 2007-0001898 A1) now U.S. Pat. No. 7,583,769; Ser. No. 11/424, 845 (US 2006-0287822 A1) now U.S. Pat. No. 7,574,300; Ser. No. 11/423,127 (US 2006-0289204 A1) now U.S. Pat. No. 7,563,991; Ser. No. 11/422,306 (US 2006-0282217 A1) now U.S. Pat. No. 7,542,849; Ser. No. 11/422,304 (US 2006-0276963 A1) now U.S. Pat. No. 7,526,381; Ser. No. 11/422, 321 (US 2006-0276161 A1); Ser. No. 11/422,329 (US 2006-0274698 A1) now U.S. Pat. No. 7,529,547; Ser. No. 11/306, 765 (US 2008-0136624 A1) now U.S. Pat. No. 7,394,361; Ser. No. 11/306,764 (US 2006-0237490 A1) now U.S. Pat. No. 7,391,321; Ser. No. 11/193,300 (US 2007-0024066 A1) now U.S. Pat. No. 7,438,334; Ser. No. 11/161,550 (US 2007-0002808 A1) now U.S. Pat. No. 7,430,437; Ser. No. 11/161,545 (US 2006-0018274 A1) now U.S. Pat. No. 7,221,668; Ser. No. 11/161,542 (US 2006-0023679 A1) now U.S. Pat. No. 7,522,568; Ser. No. 11/161,540 (US 2007-0004431 A1) now U.S. Pat. No. 7,200,132; Ser. No. 11/161,539 (US 2006-0023678 A1) now U.S. Pat. No. 7,209,468; Ser. No. 10/987,964 (US 2005-0093703 A1) now U.S. Pat. No. 7,155,264; Ser. No. 10/987,884 (US 2005-0093702 A1) now U.S. Pat. No. 7,133,704; Ser. No. 10/604,032 (US 2004-0082296 A1) now U.S. Pat. No. 6,934,540; Ser. No. 10/514,336 (US 2005-0215280 A1) now U.S. Pat. No. 7,209,771; and Ser. No. 09/681,282 (US 2002-0119770 A1) now U.S. Pat. No. 6,745,027. Each of these patent application publications and patents is hereby incorporated herein by reference for purposes of disclosure herein of common designation (CD) technology (such as, e.g., class-based network (CBN) technology); wake-up (WU) technology; and networks that utilize such technologies (such as those of Terahop Networks, Inc. of Alpharetta, Ga.). It is intended that the CD/CBN and WU technologies, and related features, improvements, and enhancements—as disclosed in these incorporated references—may be utilized in combination with various embodiments and implementations of the present invention.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND

For background and contextual information, the above identified published patent applications and patents are referenced. Additionally, it is noted that some conventional systems for tracking and/or monitoring assets (herein generally referred to as "asset tracking systems") utilize wireless tags that generally respond to any broadcast that is made. The wireless tags usually are passive, and the responses that the passive wireless tags make are often referred to as "chirps."

More sophisticated conventional asset tracking systems utilize semi-passive wireless tags and/or active wireless tags. A semi-passive wireless tag includes an internal power source for transmitting, and an active wireless tag includes an internal power source for both receiving and transmitting. Semi-passive and active wireless tags generally have greater capabilities than passive wireless tags due to the internal power sources. Of course, power consumption is always a concern when a wireless tag includes an internal power source, since the internal power supply limits the useful life of the wireless tag, after which time maintenance is required (e.g., replacement of the internal power source).

In improved asset tracking systems, such as disclosed in U.S. Pat. No. 6,934,540 and other of the above-incorporated patent applications and patents, a wireless tag responds to a broadcast if the broadcast includes a common designation matching a common designation of the wireless tag. Such a common designation may comprise, for example, an "asset class" associated with the wireless tag. Ad hoc networks further may be created based on such classes, which ad hoc networks are referred to as "class based" networks.

Class based networks (and common designation networks in general) are beneficial because, in such networks, a communication device, such as a wireless tag, generally only transmits a response to a broadcast if the broadcast includes a class (or common designation) that matches a class (or common designation) of that communication device. Indeed, in a communication device employing a wakeup sequence of one or more of the patent references incorporated herein by reference, such communication device does not even process a broadcast once it is determined that the broadcast fails to include a matching class of the communication device. Consequently, the internal power supply of a semi-passive or active communication device is not drained by needless processing and/or responses to broadcasts.

In any asset tracking system, it often is important to know the physical location of an asset. This could include knowing where the asset is within a limited physical area, such as a warehouse; this also could include knowing where the asset is within several different warehouses in several different geographical locations, as well as where the asset is during transit between such locations.

In some conventional asset tracking systems in which wireless data communication devices are placed on the assets, a method for acquiring visibility of the assets includes broadcasting within an area at regular intervals in order to solicit responses from all of the wireless data communication devices within the area. The responses from the wireless data communication devices reveal the presence of the wireless data communication devices and, by assumption, the presence of the assets in the area. This method is not advantageous because the regular, repetitive broadcasts result in an unnecessary power drain of the responding wireless data communication devices when such devices comprise active or semi-passive radios. Moreover, interference also can occur if a large number of wireless data communication devices respond at the same time, thereby making it difficult to accurately identify all of the wireless data communication devices within the area that respond to the broadcast.

In an alternative conventional method, a timer is included with each wireless data communication device and the wireless data communication device is configured to transmit at periodic intervals as a function of the timer. The wireless data communication device thereby alerts the tracking system as to the whereabouts of the wireless data communication device and by assumption, the asset with which it is associated. By including timers with the wireless data communication devices, the wireless data communication devices may transmit at different times in order to avoid unnecessary interference. A wireless data communication device also can be set to sleep during intervals of no transmissions and to be awoken by the timer for making regularly scheduled transmissions. This increases the useful life of the wireless data communication devices because the wireless data communication devices do not consume power by actively listening for broadcasts while sleeping.

While this alternative method permits determinations as to the delivery and continued presence of an asset at a particular area, this alternative method does include drawbacks. For instance, by using timers, the wireless data communication devices are usually inaccessible by the asset tracking system during the sleep periods. Another drawback is that the wireless data communication devices automatically awake and transmit without regard to their location and without regard to whether the transmissions are actually warranted or even desired. In this respect, during transportation on a plane, for example, a wireless data communication device may awaken and transmit, thereby causing unwanted interference with the operation of the plane. Preprogrammed transmissions at regular intervals also may reveal the presence of the asset to unauthorized persons snooping for such radio transmissions.

Yet another alternative method for determining presence is disclosed and described in U.S. patent appl. publ. no. US 2007-0155327, incorporated herein by reference above. In accordance with an inventive aspect of the '327 application publication, a radio frequency (RF) communication device operates in at least two states.

In the first state, the RF communication device responds to a radio frequency transmission that includes data representative of an inquiry as to the presence of RF communication devices within an area. The "data representative of an inquiry as to the presence of radio frequency communication devices within an area" simply may be a predefined value in a particular format within the broadcast in accordance with a predefined protocol. A radio frequency transmission that includes such data is sometimes referred to therein as a "Present Broadcast." The response to the Present Broadcast is made by the RF communication device by making a radio frequency transmission that includes an identification of the RF communication device. A radio frequency transmission that includes an identification of the RF communication device making the transmission, and that is made in response to a Present Broadcast, is sometimes referred to therein as a "Present Response."

In the second state, the RF communication device does not respond to a Present Broadcast with a Present Response; specifically, no response to a Present Broadcast comprising a radio frequency transmission is made that includes an identification of the RF communication device, and preferably, no response to a Present Broadcast comprising a radio frequency transmission is made at all, whether including an identification of the RF communication device or otherwise.

The electronic components of the RF communication device are arranged and configured such that the RF communication device enters the second state from the first state upon responding to a Present Broadcast with a Present Response. The electronic components further are arranged and configured such that the RF communication device enters the first state from the second state upon receiving, through a sensor interface thereof, a sensor signal based on sensor-acquired data that is indicative of a predetermined condition. The sensor signal itself may include the sensor-acquired data or may be representative of the sensor-acquired data and may indicate, for example, a state of the sensor or movement of the RF communication device. In any event, such sensor signal is deemed to provide "sensor-acquired information" through the interface. The electronic components also further may be arranged and configured such that the RF communication device enters the first state from the second state upon receiving an instruction to do so, and the electronic components further may be arranged and configured such that the RF communication device enters the second state from the first state upon receiving an instruction to do so. The electronic components also further may be arranged and configured such that the RF communication device enters the first state after a predetermined period of time has passed or after a predetermined number of failed attempts to communicate by the RF communication device have occurred.

While these approaches represent solutions to determining presence, needs remain for still yet further improvements in methods for determining presence.

This, and other needs, are addressed by one or more aspects of the present invention.

SUMMARY

The invention of the present application generally relates to networks, apparatus, methods and systems for determining the presence of a radio frequency communication device within a wireless data communications network, and especially for determining such presence in an ad hoc wireless data communications network in which at least some wireless data communication devices forming nodes of the network are at least periodically mobile. In this context, the present invention includes many aspects and features. Moreover, while many aspects and features relate to, and are described in, the context of asset tracking systems, the present invention is not limited to use only in asset tracking systems, as will become apparent from the following summaries and detailed descriptions of aspects, features, and one or more embodiments of the present invention. Indeed, the present invention is equally useful in remote sensor networks and the like for remote monitoring, whether such monitoring is the monitoring of assets or otherwise.

In a principal aspect of the invention of the present application, a wireless two-way RF data communication device that forms a node of a data communications network includes: a memory having stored therein an unique identifier of the wireless two-way RF data communication device that uniquely identifies the wireless two-way RF data communication device within the data communications network; a receiver configured to receive radio frequency transmissions; a transmitter configured to make radio frequency transmissions; and electronic components arranged and configured (i) such that the wireless two-way RF data communication device communicates with other nodes of the data communications network in communicating messages from originating nodes to destination nodes, (ii) such that each message that is communicated by the wireless two-way RF data communication device either as an originating node or an intermediate node includes the unique identification of the wireless two-way RF data communication device, (iii) such that the wireless two-way RF data communication device communicates a presence message to a presence server at routine intervals based on a chronometer; and (iv) such that the measurement of the time until the next check-in message is to be sent by the wireless two-way RF data communication device is reset upon, (A) communicating, as an intermediate node, a message originating at another node of the data communications network, and (B) receiving, for deliver to the originating node of the message, an acknowledgement of receipt by the presence server for such message. The message of the originating node may itself be a check-in message or another message.

In a feature, the electronic components of the wireless two-way RF data communication device are further arranged and configured such that each message that is communicated by the wireless two-way RF data communication device includes the unique identification of each intermediate node by which the message has been communicated in the data communications network.

In a feature, the electronic components of the wireless two-way RF data communication device are further arranged and configured such that each message that is communicated by the wireless two-way RF data communication device includes the unique identification of the originating node for the message in the data communications network.

In a principal aspect of the invention of the present application, a data communications network includes: a plurality of wireless two-way radio frequency (RF) data communication devices, each wireless two-way RF data communication device forming a node of the data communications network and each wireless two-way RF data communication device including a memory having stored therein an unique identifier of the wireless two-way RF data communication device; wherein each wireless two-way RF data communication device comprises, (i) a receiver configured to receive radio frequency transmissions, (ii) a transmitter configured to make radio frequency transmissions, and (iii) electronic components arranged and configured (A) such that the wireless two-way RF data communication device communicates with other nodes of the data communications network in communicating messages from originating nodes to destination nodes, (B) such that each message that is communicated by the wireless two-way RF data communication device, either as an originating node or an intermediate node, includes the unique identification of the wireless two-way RF data communication device, whereby a pathway by which each message is communicated in the data communications network is included with the message as the message is communicated in the data communications network, (C) such that the wireless two-way RF data communication device communicates a presence message to a presence server at routine intervals based on a chronometer, and (D) such that the measurement of the time until the next check-in message is to be sent by the wireless two-way RF data communication device is reset upon, (I) communicating, as an intermediate node, a message originating at another node of the data communications network, and (II) receiving, for deliver to the originating node of the message, an acknowledgement of receipt by the presence server for such message. The message of the originating node may itself be a check-in message or another message.

In a feature, the identification of an intermediate node of the pathway by which the electronic message has been communicated is added to the pathway information by an intermediate node.

In a feature, each node comprises a wireless radio-frequency data communication device having a transmitter and a receiver that collectively receive and transmit information wirelessly.

In a feature, each wireless two-way RF data communication device comprises a standards-based data packet radio component that includes both said receiver and said transmitter of the respective wireless two-way RF data communication device.

In a feature, the information is wirelessly communicated in data packets.

In a feature, the data communication device includes an interface for communicating with a sensor for receiving sensor-acquired data.

In a feature, the data communication device is attached to an asset for monitoring and tracking of the asset.

In a feature, the data communication device is permanently affixed to a structure for monitoring and/or tracking assets that come within a proximity thereto.

In a feature, the communication includes a message identification that is unique to the message being communicated within the data communications network.

In a feature, each communication of a message within the data communications network includes a predetermined pathway by which the message is to be communicated.

In a principal aspect of the invention of the present application, and with respect to the context of a data network comprising a plurality of wireless two-way radio frequency (RF) data communication devices, each wireless two-way RF data communication device forming a node of the data communications network, a method of tracking a pathway by which a message is communicated within a data communications network includes the steps of: maintaining a unique identification of each of the plurality of wireless two-way RF data communication devices that form a node of the data communications network; and for each wireless two-way RF data communication device that communicates a message in the data communications network, including with the message the unique identification of the wireless two-way RF data communication device such that the pathway by which the message is sent from an originating node to a destination node is communicated to the destination node upon delivery of the message to the destination node, and wherein each wireless two-way RF data communication device performs the steps of, (i) communicating a message from a first node of the data communications network to a gateway device along a pathway, the pathway including the wireless data communication device as an intermediary node of the pathway, (ii) including with the message the pathway by which the message is communicated in the wireless data communication device, (iii) storing, in a computer readable medium at the gateway device, information representing the pathway, (iv) updating, at the gateway device, presence information of the wireless data communication device, (v) communicating an acknowledgment of the message to the first node along the reverse pathway, and (vi) upon communicating the acknowledgement of the message by the wireless data communication device in said step (f), resetting a timer used by the wireless data communication device to trigger the sending of a presence indication of the wireless data communication device to the gateway device.

In a feature, each wireless two-way RF data communication device that comprises an intermediate node with respect to communicating a message from an originating node to a destination node in the data communications network includes with the message its unique identification when communicating the message to the next subsequent node.

In a feature, each node in the data communications network that receives a communication of a message from a wireless two-way RF data communication device includes, with the message, the unique identification of the wireless two-way RF data communication device from which the message is communicated.

In a principal aspect of the invention of the present application, a method of maintaining presence information associated with a wireless data communication device of a data communications network, comprising the steps of: communicating a message from a first node of the data communications network to a gateway device along a pathway, the pathway including the wireless data communication device as an intermediary node of the pathway; including with the message the pathway by which the message is communicated in the wireless data communication device; storing, in a computer readable medium at the gateway device, information representing the pathway; updating, at the gateway device, presence information of the wireless data communication device; communicating an acknowledgment of the message to the first node along the reverse pathway; and upon communicating the acknowledgement of the message by the wireless data communication device in said step (f), resetting a timer used by the wireless data communication device to trigger the sending of a presence indication of the wireless data communication device to the gateway device.

In a feature, the method further comprises the step of communicating, by the gateway device, to an application of a client device, the message from the first node.

In a feature, the method further comprises the step of receiving, by the gateway device, an acknowledgement of the message from the application of the client device for communicating to the first node.

In a feature, the wireless data communication device is configured to communicate a check-in message when the timer reaches a certain value.

In a feature, the gateway device, the first node, and the wireless data communication device forming an intermediate node are part of a network utilizing class based networking.

In a feature, the first node and the wireless data communication device forming an intermediary node utilize wake-up technology.

In a feature, the method further comprises, prior to communicating a message from a first node, registering with the gateway device by the wireless data communication device.

In a feature, the gateway device, the first node, and the wireless data communication device forming an intermediary node are part of a mesh network.

In a feature, said step of resetting a timer occurs contemporaneously with the step of communicating the acknowledgment.

In a feature, the gateway device comprises a gateway server.

In a feature, said step of communicating to a client device comprises communicating over the Internet.

In a feature, the wireless data communication device comprises a data packet radio component.

In a principal aspect of the invention of the present application, a method of indicating presence by a wireless data communication device that forms a node in a data communications network, comprising the steps of: receiving, at the wireless data communication device, a message originating at a first node and addressed to a gateway device; storing, in a computer readable medium of the wireless data communication device, information associated with the message; communicating, by the wireless data communication device, for delivery to gateway device, the message to another node of the data communications network; receiving, at the wireless data communication device, an acknowledgment of the message by the gateway device; resetting a timer at the wireless data communication device; and communicating, by the wireless data communication device, for delivery to the first node, the acknowledgment of the message by the gateway device; wherein the wireless data communication device is configured to communicate a message to the gateway device indicating the presence of the wireless data communication device as a node in the data communications network at predetermined intervals based on the timer.

In a feature, said step of communicating the message to the gateway device comprises communicating the message directly to the gateway device.

In a feature, said step of communicating the message to the gateway device comprises communicating the message indirectly to the gateway device via one or more other nodes.

In a feature, said step of communicating the acknowledgment of the message to the first node comprises communicating the message directly to the first node.

In a feature, said step of communicating the acknowledgment of the message to the first node comprises communicating the message indirectly to the first node via one or more other nodes.

In a feature, the method further comprises the step of, prior to said step of receiving a message originating at a first node, registering, by the intermediary node, with the gateway device.

In a feature, the gateway device, the first node, and the intermediary node are part of a mesh network.

In a feature, the gateway device, the first node, and the intermediary node are part of a network utilizing class based networking.

In a feature, the first node and the intermediary node utilize wake-up technology.

In a principal aspect of the invention of the present application, a data communications network for which presence information is maintained for wireless data communication devices forming nodes of the network, the data communications network comprising: a presence server configured to communicate an acknowledgment in response to a check-in message; a plurality of outer nodes configured to send periodic check-in messages to the presence server; and a plurality of inner nodes configured to send periodic check-in messages to the presence server; (d) wherein a communication from one of the plurality of outer nodes to the presence server is communicated by at least one of the plurality of inner nodes as an intermediate node; wherein each of the plurality of inner nodes is configured to reset a timer associated with the sending of the check-in messages upon, (i) communicating, as an intermediate node, a check-in message originating at one of the outer nodes, and (ii) communicating, as an intermediate node, a corresponding acknowledgment originating at the presence server; and (f) wherein the presence server is configured to, (i) update presence information associated with one of the plurality of outer nodes in response to receiving a check-in message originating from such outer node, and (ii) update presence information associated with each inner node that communicates, as an intermediate node, the check-in message of the outer node.

In a feature, the presence server updates the presence information associated with the outer node and each inner node that communicates, as an intermediate node, the check-in message of the outer node, upon sending an acknowledgement of receipt of the message to the outer node along a pathway that includes each of the inner nodes that communicated the check-in message of the outer node.

In a feature, the presence server comprises a server disposed in electronic communication with a gateway device of the data communications network.

In a feature, the presence server comprises a gateway server of the data communications network.

In another aspect relating to ad hoc wireless networks in which communications between a node of the wireless ad hoc network and a network external thereto ("External Network") may undergo one or more hops in the ad hoc wireless network, an identification of each node forming the communications pathway of a message is recorded and sent with the message as the message is communicated between nodes in the ad hoc network. Accordingly, a message that reaches a node representing a gateway to the External Network ("Gateway") will include with it sufficient information so as to identify a pathway of the wireless ad hoc data communications network by which the message has been sent and, in particular, so as to identify each intermediate node that participated in the communication of the message.

Another aspect of the present invention relates to a method of maintaining presence information associated with an intermediary node. The method includes communicating a message from a first node to a gateway device along a pathway, the pathway including the intermediary node; storing, in a computer readable medium at the gateway device, information representing the pathway; communicating, to an application of a client device, the message; updating, at the gateway device, presence information associated with the intermediary node; communicating an acknowledgment from the client device to the first node along the pathway, determination of the pathway being aided by the stored information representing the pathway; and resetting, at the intermediary node, a timer.

In a feature of this aspect of the invention, the intermediary node is configured to communicate a check-in message when the timer reaches a certain value.

In a feature of this aspect of the invention, the gateway device, the first node, and the intermediary node are part of a network utilizing class based networking.

In a feature of this aspect of the invention, the first node and the intermediary node utilize wake-up technology.

In a feature of this aspect of the invention, the method further includes the steps of, prior to said step of communicating a message from a first node, registering, by the first node, with the gateway device; and registering, by the intermediary node, with the gateway device.

In a feature of this aspect of the invention, the gateway device, the first node, and the intermediary node are part of a mesh network.

In a feature of this aspect of the invention, said step of resetting a timer occurs contemporaneously with said step of communicating an acknowledgment.

In a feature of this aspect of the invention, the gateway device comprises a gateway router and a gateway server.

In a feature of this aspect of the invention, said step of communicating to a client device is performed by the gateway device.

Another aspect of the present invention relates to a method of maintaining presence information associated with an intermediary node. The method includes receiving, at the intermediary node, a message originating at a first node and addressed to a gateway device; storing, in a computer readable medium at the intermediary node, information associated with the message; communicating the message to the gateway device; receiving, at the intermediary node, an acknowledgment of the message; resetting a timer at the intermediary node; and communicating the acknowledgment of the message to the first node.

In a feature of this aspect of the invention, said step of communicating the message to the gateway device comprises communicating the message directly to the gateway device.

In a feature of this aspect of the invention, said step of communicating the message to the gateway device comprises communicating the message indirectly to the gateway device via one or more other nodes.

In a feature of this aspect of the invention, said step of communicating the acknowledgment of the message to the first node comprises communicating the message directly to the first node.

In a feature of this aspect of the invention, said step of communicating the acknowledgment of the message to the first node comprises communicating the message indirectly to the first node via one or more other nodes.

In a feature of this aspect of the invention, the method further includes the step of, prior to said step of receiving a message originating at a first node, registering, by the intermediary node, with the gateway device.

In a feature of this aspect of the invention, the gateway device, the first node, and the intermediary node are part of a mesh network.

In a feature of this aspect of the invention, the gateway device, the first node, and the intermediary node are part of a network utilizing class based networking.

In a feature of this aspect of the invention, the first node and the intermediary node utilize wake-up technology.

Another aspect of the present invention relates to a network configured to maintain presence information associated with a plurality of nodes. The network includes a gateway device configured to communicate an acknowledgment in response to a check-in message; a plurality of outer nodes configured to send periodic check-in messages to the gateway device; and a plurality of inner nodes configured to send periodic check-in messages to the gateway device; wherein a communication from one of the plurality of outer nodes to the gateway device has to pass through at least one of the plurality of inner nodes on its way to the gateway device; and wherein each of the plurality of inner nodes is configured to reset a timer associated with the sending upon communicating a check-in message originating at one of the outer nodes, and communicating a corresponding acknowledgment originating at the gateway device; and wherein the gateway device is configured to update presence information associated with one of the plurality of outer nodes in response to receiving a check-in message originating at the one of the plurality of outer nodes, and update presence information associated with one of the plurality of inner nodes in response to receiving a check-in message that passed through the one of the plurality of inner nodes.

In a feature of this aspect of the invention, the first node and the intermediary node utilize wake-up technology.

In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals, and wherein:

FIG. 4 illustrates a table showing the respective number of node transmissions for each of the sets of nodes.

DETAILED DESCRIPTION

Figure 1:
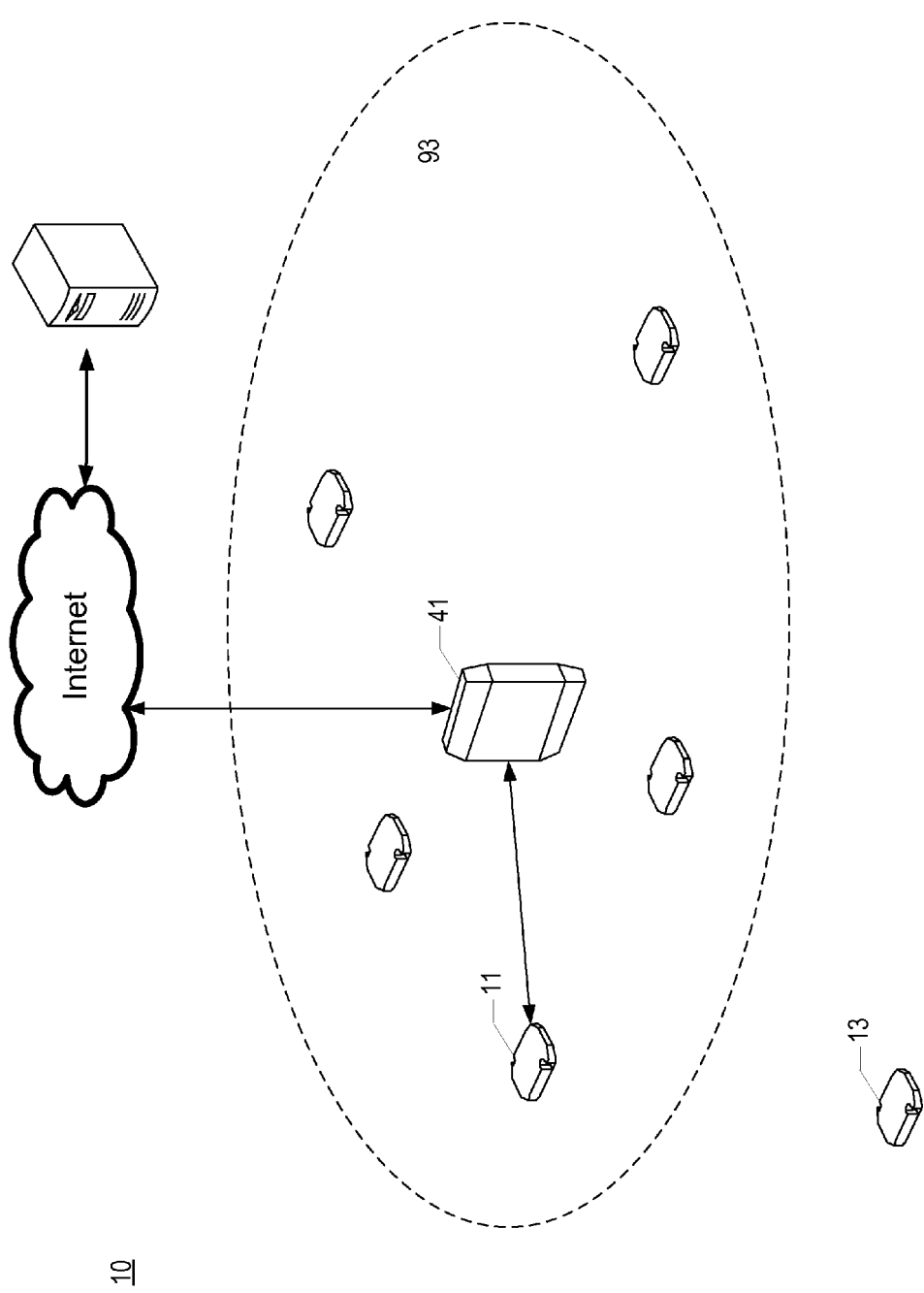
FIG. 1 illustrates a data communications network in accordance with a preferred embodiment of the invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Turning now to the drawings, FIG. 1 illustrates a data communications network 10 in accordance with one of many different preferred embodiments of the present invention. The network 10 includes a gateway controller or gateway server 41 and a wireless data communication device forming a remote sensor node 11 (sometimes referred to, and hereinafter, "RSN", "RSN" or simply "node"). The wireless data communication device of node 11 is within a communication range and, thus, inside a coverage area, of the gateway server 41, as indicated by the dotted line, and the wireless data communication device has registered with the gateway sever 41 and forms node 11 of the data communications network 10. FIG. 1 also illustrates another wireless data communication device 13 which lies outside the coverage area of the gateway server 41 and has not registered with the gateway server 41 and does not form a node of the data communications network 10.

Figure 2:
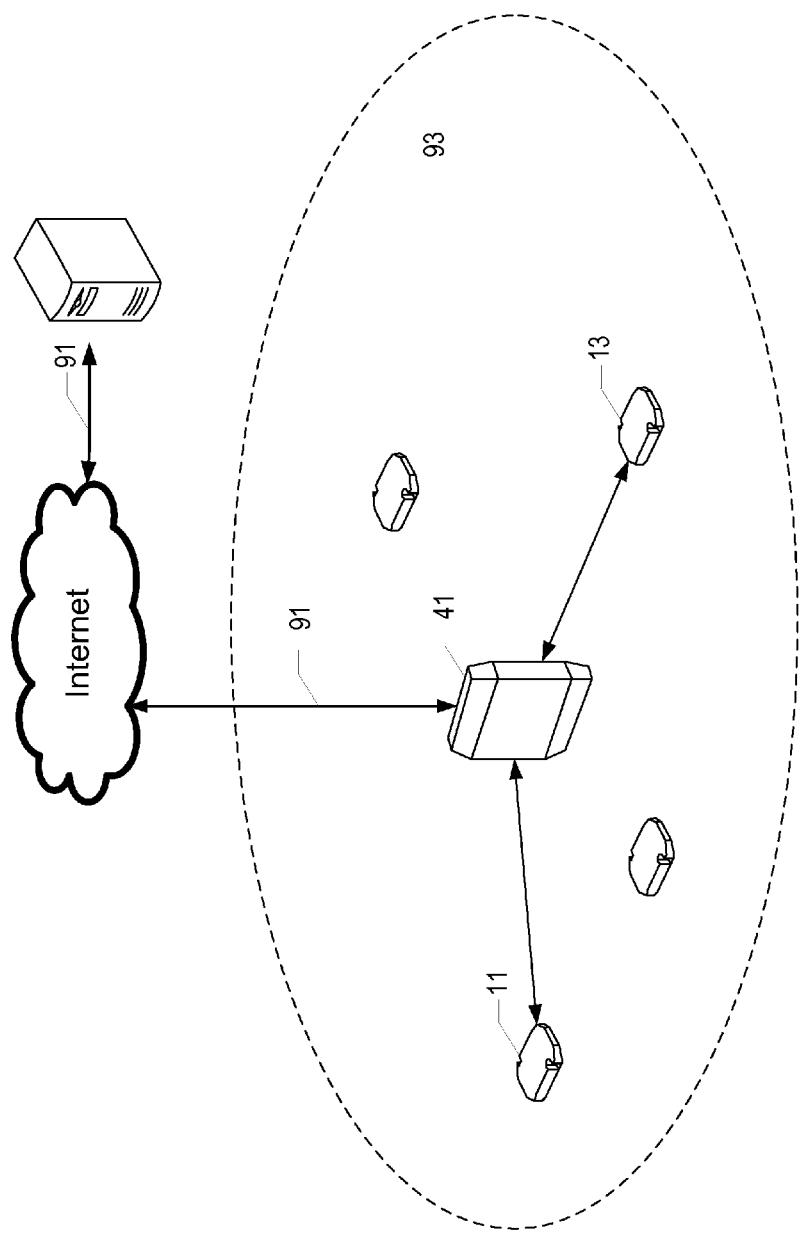
FIG. 2 illustrates the data communications network of FIG. 1 wherein a node 13 has moved to within the coverage area of the gateway server 41.

FIG. 2 illustrates data communications network 10 of FIG. 1 wherein node 13 has moved to within the coverage area of the gateway server 41. Upon entering the coverage area, node 13 registers or "checks-in" with the gateway server 41, alerting the gateway server 41 to the presence of the wireless data communication device 13 within the coverage area. Additionally, gateway server 41 communicates 91 with a client application on a user device, such as user server 93, via an API interface of the gateway server 41, informing the client application of the presence of the wireless data communication device now forming node 13 in the data communications network. It will be appreciated that for some client applications, the regular determination of the presence of a wireless data communication device within the coverage area of the gateway server 41, such as by use of check-in messages, is desirable in order to allow the client application to monitor and confirm the location of the wireless data communication device 13. For example, each wireless data communication device may be configured to communicate a check-in message to the client application, via the gateway server 42, at predefined intervals of time.

In the foregoing illustration of a preferred embodiment, it will be appreciated that the client application serves as a "presence server" in keeping track of presence information for the wireless data communications device 13. The client application may serve as the presence server for all of the wireless data communication devices or, alternatively, a subset thereof. Moreover, the gateway server 41 also may function as a presence server for one or more of the wireless data communication devices. For example, all wireless data communication devices associated with shipments for Wal-Mart may be tracked, and the presence information thereof maintained, by a first presence server, while those wireless data communication devices associated with shipments for Target may be tracked, and the presence information thereof maintained, by a second, different presence server, even though presence information (e.g., check-in messages) are communicated over the Internet by way of the gateway server. The locations may include each waypoint and in-transit locations in the logistic chain between the manufacturer and the various retail stores.

Figure 3:
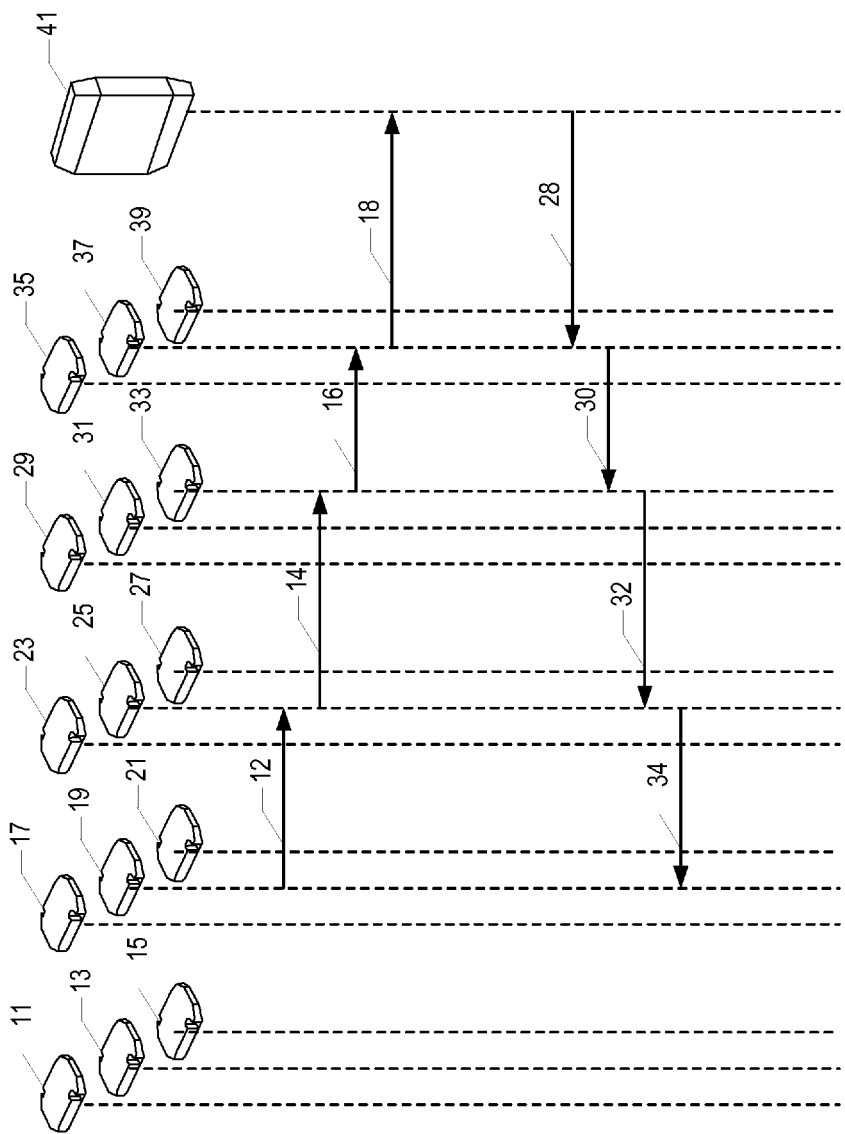
FIG. 3 illustrates the data communications network 10 of FIG. 1 in which fifteen wireless data communication devices form nodes 11-39 (odd)

FIG. 3 illustrates the data communications network 10 of FIG. 1 in which fifteen wireless data communication devices form nodes 11-39 (odd). It will be appreciated that, in this implementation, communications pass through, or "hop" along, intermediate nodes in traveling from and to outer nodes to the gateway server; indeed, the outer nodes may be out of range of direct radio frequency communications with the gateway server. More specifically, FIG. 3 illustrates a check-in message originating at node 19, which requires three "retransmissions" or hops to get from node 19 to the gateway 41. The pathway for the three hops, as illustrated in this example, is from node 25 to node 33 via hop 14; from node 33 to node 37 via hop 16; from node 37 to gateway server 41 via hop 18. (Note that the initial transmission 12 by node 19 to node 25 is not considered or deemed a "hop" herein because it is the initial transmission.)

After the message has been communicated to the respective presence server (which in this case shall be deemed to be the gateway server 41), the gateway server 41 returns an acknowledgment (hereinafter, "ACK") of the check-in message to the initiating node 19. The pathway by which the ACK is communicated is the reverse of the pathway by which the check-in message is communicated, and includes transmission 28 with hops 30, 32, and 34.

In total, communication of a check-in message from node 19 to the gateway server 41 requires four total node transmissions (the initial transmission and three hops), and communication of an acknowledgment from the gateway server 41 to the node 19 requires three node transmissions (each a hop) with the initial transmission being by the gateway server 41.

It will be appreciated from the above description and FIG. 3 that nodes 11,13,15 each require four hops in communicating a check-in message to gateway server 41; nodes 17,19,21 each require three hops in communicating a check-in message to gateway server 41; nodes 23,25,27 each require two hops in communicating a check-in message to gateway server 41; nodes 29,31,33 each require one hop in communicating a check-in message to gateway server 41. Nodes 35,37,39 do not require any hops in communicating a check-in message to gateway server 41 as each directly communicates with the gateway server 41.

The respective number of node transmissions for each of these sets of nodes is set forth in Table 1 of FIG. 4. For example, nodes 11,13,15 each require eight hops or node retransmissions to communicate a check-in message and receive an acknowledgment back. Multiplying these eight required transmissions by the number of nodes, i.e. three, results in a total of twenty-four required node retransmissions for check-in messages from nodes 11,13,15 per check-in interval, e.g., every fifteen minutes.

It will be appreciated that having a large number of nodes with a pathway to the gateway router 41 including a large number of hops greatly increases the total number of node retransmissions required for check-in messages. As can be seen in FIG. 4, the total number of node retransmissions required for a check-in message and corresponding acknowledgment for each of the fifteen nodes of network 10 is sixty.

The total required number of node retransmissions, in accordance with the principal invention of the present application, is reduced as now described.

Specifically, each communication of a check-in message preferably includes the pathway by which the check-in message has actually be communicated by the wireless data communication devices. Moreover, the pathway preferably is identified by unique identifications a unique identifier (hereinafter, "UID") of each wireless data communication device participating in the hops. The respective UID of a node retransmitting the message preferably is appended to the communication of the message with each hop.

When the gateway server 41 receives the check-in message from node 19, the gateway server 41 identifies from the pathway the nodes along which the message has hopped, i.e., through intermediate nodes 25, 33, and 37. In particular, the gateway server 41 analyzes the message to determine the UID of each node along the pathway. Then, rather than only considering the check-in message of node 19, the gateway server 41 further utilizes these UIDs of the pathway to determine the presence of these additional nodes. The presence information for each of these nodes consequently is updated.

Importantly, the ACK that is sent to node 19 is sent along the reverse pathway by which the check-in message was sent to the gateway server 41. This insures that each intermediate node receives and retransmits the ACK for delivery to node 19. In doing so, each intermediate node thereby receives its own acknowledgement that its presence, as indicated by the pathway information, has been acknowledged by the gateway server 41.

In this respect, each intermediate node 25, 33, and 37 remembers that it passed (hopped) an inbound check-in message from the initiating node 19 and, when it passes (hops) the ACK back to the initiating node 19, the intermediate node 25, 33, and 37 uses the ACK as a positive indication that the inbound check-in message was delivered. Based on this, each of the intermediate nodes 25, 33, and 37 causes the check-in interval to be reset to zero as if the respective node had sent a check-in message itself and received back an ACK. As such, none of the intermediate nodes will send its own check-in message until its respective time interval for doing so (starting at the time of retransmitting the ACK for delivery to node 19) has passed.

In will further be appreciated that, in accordance with the current inventive aspect of the invention of the present application, messages that are hopped need not be check-in messages of the outer nodes but, instead, may be other types of messages.

In general, the intermediate nodes 25,33,37 now benefit from hopping inbound messages, as each resets its chronometer (clock or timer) for counting down its check-in interval, none need to send a check-in message as quickly as it otherwise would have done if there had been no message hopping. As an example, the outside nodes 11,13,15 may send check-in messages every 15 minutes, with each of all of the other nodes serving as intermediate nodes for the outside nodes 11,13,15, whereby check-in messages for such intermediate nodes would not be required to be sent. In this scenario, only twenty-four retransmissions or hops thus are required, instead of 60 hops as set forth in table 1 of FIG. 4 (a sixty-percent reduction!).

Figure 5:
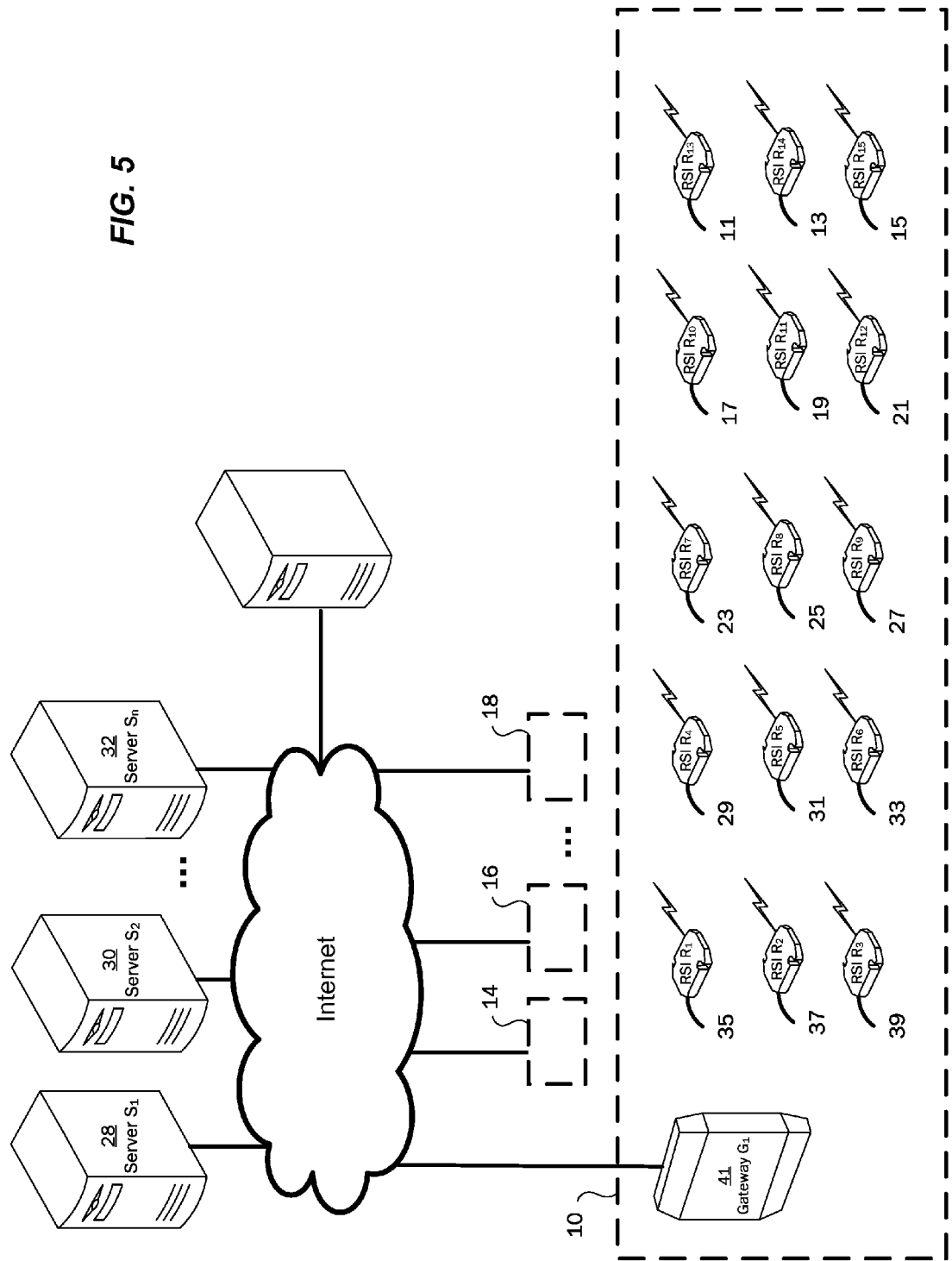
FIG. 5 illustrates, for perspective, a data communications network having multiple user servers and client applications as well as multiple locations, each having a gateway server.

For perspective, the data communications network 10 is shown in FIG. 5 with respect to multiple user servers and client applications as well as multiple locations each having a gateway server.

It will be appreciated from the above description that intelligence within nodes and other gateways allows message information from intermediate, hopping nodes to be utilized in reducing the overall number of required hops in the data communications network when all nodes are configured to send their own check-in messages.

Moreover, data communications networks in accordance with preferred embodiments of the invention provide other benefits as well, including allowing for a high density of nodes, extending battery life of the nodes, reducing the number of retransmissions as well as initial transmissions by each node, and supplying "free" application messages to nodes when they are used as intermediate nodes.

It will be appreciated from the above description that aspects and features in accordance one or more embodiments of the present invention may be utilized with a wide variety of types of networks and in a wide variety of contexts. For example, aspects and features in accordance with embodiments of the present invention may be utilized in combination with mesh networking or class based networking. Further, aspects and features may be utilized to assist in first responder situations, to assist in container tracking and monitoring, and to track and monitor equipment, including rental construction equipment. It is intended that the class based networking and wakeup technologies, and related features, improvements, and enhancements, as disclosed in the references incorporated herein, may be utilized in combination with various embodiments and implementations of the present invention.

For example, in a preferred embodiment, a system is configured to cause RSNs connected to a network to send quasi-periodical check-in messages to indicate to the network that the RSN is still present (in the RF-vicinity of a gateway). The network knows when to expect such messages. If a defined number of these messages are not received within a defined period, than an infrastructure of the network sends a message to the user application that an asset associated with the silent RSN is unaccounted for. A timer is used to determine when to send these messages, but is reset as a result of various communication activities of the RSN. When an RSN passes a communication from another RSN along (i.e., a message is being hopped and the RSN is in a communication pathway between another RSN and a gateway), information is also passed along with the message that allows the gateway controller or server to know that the RSN was involved in the communication as an intermediate node. Then, when an acknowledgment is passed back along the same pathway, the RSN knows that the gateway controller or server is cognizant of its continued presence. Thus, by passing a communication on along a pathway that eventually leads to the gateway that the RSN is supposed to periodically check in with, the RSN has essentially informed the gateway that it is still present. Consequently, the RSN can reset its check-in timer, as there is no need to send a check-in message when the gateway is already aware that the RSN is still there. This methodology helps to reduce radio activity while still allowing for monitoring of RSN presence.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method of maintaining presence information associated with a wireless data communication device of a data communications network, comprising:

communicating a message from a first node of the data communications network to a gateway device along a pathway, the pathway including the wireless data communication device as an intermediary node of the pathway;

including with the message the pathway by which the message is communicated in the wireless data communication device;

storing, in a computer readable medium at the gateway device, information representing the pathway;

updating, at the gateway device, presence information of the wireless data communication device;

communicating an acknowledgment of the message to the first node along a reverse pathway; and upon communicating the acknowledgement of the message by the wireless data communication device, resetting a timer used by the wireless data communication device to trigger the sending of a presence indication of the wireless data communication device to the gateway device;

communicating, by the gateway device, to an application of a client device, the message from the first node.

2. The method of claim 1, further comprising of receiving, by the gateway device, an acknowledgement of the message from the application of the client device for communicating to the first node.

3. The method of claim 1, wherein the wireless data communication device is configured to communicate a check-in message when the timer reaches a certain value.

4. The method of claim 1, wherein the gateway device, the first node, and the wireless data communication device forming an intermediate node are part of a network utilizing class based networking.

5. The method of claim 1, wherein the first node and the wireless data communication device forming an intermediary node utilize wake-up technology.

6. The method of claim 1, further comprising, prior to communicating a message from a first node, registering with the gateway device by the wireless data communication device.

7. The method of claim 1, wherein the gateway device, the first node, and the wireless data communication device forming an intermediary node are part of a mesh network.

8. The method of claim 1, wherein said resetting a timer occurs contemporaneously with said communicating the acknowledgment.

9. The method of claim 1, wherein the gateway device comprises a gateway server.

10. The method of claim 1, wherein said communicating to an application of a client device comprises communicating over the Internet.

11. The method of claim 1, wherein the wireless data communication device comprises a data packet radio component.

12. A method of maintaining presence information associated with a wireless data communication device of a data communications network, comprising:

communicating a message from a first node of the data communications network to a gateway device along a pathway, the pathway including the wireless data communication device as an intermediary node of the pathway;

including with the message the pathway by which the message is communicated in the wireless data communication device;

storing, in a computer readable medium at the gateway device, information representing the pathway;

updating, at the gateway device, presence information of the wireless data communication device;

communicating an acknowledgment of the message to the first node along a reverse pathway; and upon communicating the acknowledgement of the message by the wireless data communication device, resetting a timer used by the wireless data communication device to trigger the sending of a presence indication of the wireless data communication device to the gateway device;

receiving, by the gateway device, an acknowledgement of the message from an application of a client device for communicating to the first node.

13. The method of claim 12, wherein the wireless data communication device is configured to communicate a check-in message when the timer reaches a certain value.

14. The method of claim 12, wherein the gateway device, the first node, and the wireless data communication device forming an intermediate node are part of a network utilizing class based networking.

15. The method of claim 12, wherein the first node and the wireless data communication device forming an intermediary node utilize wake-up technology.

16. The method of claim 12, further comprising, prior to communicating a message from a first node, registering with the gateway device by the wireless data communication device.

17. The method of claim 12, wherein the gateway device, the first node, and the wireless data communication device forming an intermediary node are part of a mesh network.

18. The method of claim 12, wherein said resetting a timer occurs contemporaneously with said communicating the acknowledgment.

19. The method of claim 12, wherein the gateway device comprises a gateway server.

20. The method of claim 12, wherein the wireless data communication device comprises a data packet radio component.

* * * * *